(12) United States Patent
Khare et al.

(10) Patent No.: US 12,052,247 B2
(45) Date of Patent: Jul. 30, 2024

(54) DELEGATION BASED ACCESS TO SECURE SYSTEMS

(71) Applicant: salesforce.com, inc., San Francisco, CA (US)

(72) Inventors: Adarsh Khare, Sammamish, WA (US); Shruthi Chikkanna, Issaquah, WA (US); Peixuan Jiang, Bellevue, WA (US); Isaac Westlund, Seattle, WA (US); Hideyuki Komaki, Bellevue, WA (US); Hayk Baluyan, Bellevue, WA (US); Giridharan Sridharan, Bellevue, WA (US); Mitchell Brent DiNicola, Sammamish, WA (US); Ajay Thargan, Bellevue, WA (US)

(73) Assignee: Salesforce, Inc., San Francisco, CA (US)

( * ) Notice: Subject to any disclaimer, the term of this patent is extended or adjusted under 35 U.S.C. 154(b) by 160 days.

(21) Appl. No.: 17/740,159

(22) Filed: May 9, 2022

(65) Prior Publication Data
US 2023/0362162 A1  Nov. 9, 2023

(51) Int. Cl.
*H04L 9/40* (2022.01)
*G06F 9/455* (2018.01)

(52) U.S. Cl.
CPC ...... *H04L 63/0884* (2013.01); *G06F 9/45558* (2013.01); *H04L 63/0823* (2013.01); *G06F 2009/45587* (2013.01)

(58) Field of Classification Search
None
See application file for complete search history.

(56) References Cited

U.S. PATENT DOCUMENTS

| 8,990,809 | B1* | 3/2015 | Jacob | G06F 9/45533 718/1 |
|---|---|---|---|---|
| 2016/0224358 | A1* | 8/2016 | Subramanian | G06F 9/45533 |
| 2018/0365045 | A1* | 12/2018 | Hakala | G06F 21/575 |
| 2020/0301839 | A1* | 9/2020 | Kral | H04L 67/10 |
| 2021/0058388 | A1* | 2/2021 | Knotwell | G06F 9/45558 |
| 2023/0291576 | A1* | 9/2023 | Wrobel | H04L 9/3268 |

* cited by examiner

*Primary Examiner* — Trang T Doan
(74) *Attorney, Agent, or Firm* — Sterne, Kessler, Goldstein & Fox P.L.L.C.

(57) ABSTRACT

A system receives an access token generated by a user performing authentication via an authentication device, for example, a smart card. The system obtains a personalized virtual machine assigned to the user. The system exchanges the access token for a temporary certificate having an expiry time. The system provides the temporary certificate that includes verifiable user identity to a personalized virtual machine. The system provides the user with access to the personalized virtual machine. The system allows the user to present verifiable user identity and connect to any of a plurality of systems without requiring the user to authenticate again using the authentication device. After the expiry time of the temporary certificate is exceeded, the system denies subsequent requests from the user to connect to any of the plurality of systems.

20 Claims, 7 Drawing Sheets

DELEGATION BASED ACCESS TO SECURE SYSTEMS

BACKGROUND

Field of Art

The disclosure relates to access control in secure computing environments in general and more specifically to using a delegation based model for enabling access in highly secure environments.

Description of the Related Art

High security environments often require users to use special certificates for authentication. Furthermore, keys for these certificates are also obtained using secure mechanisms. For example, users may be required to use smart cards using special workstations for gaining access. These smart cards contain a computer chip programmed with personal information about the user and one or more access points that the individual is allowed to enter. A user who needs access to multiple hosts or applications is required to authenticate using the smart card multiple times, once for each host or web application that the user needs to log into. Some secure environments further restrict access to specific environments from machines that may not have hardware needed to use smart cards. As a result, it may not be possible to perform smart card based authentication for these environments.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

DETAILED DESCRIPTION

A system, for example, an online system allows users to authenticate using an authentication device, for example, a workstation that performs authentication based on a smart card. The online system acts as a gateway through which the user can access different resources for a fixed period of time after performing authentication using the authentication device. The user can access other resources inside the perimeter of secure environment, by logging into the online system using the user's regular credentials. Once the user connects with the online system, the user can use the pre-provisioned credentials generated for the user by the online system to access other resources (for example, hosts and web applications) inside the secure perimeter.

Overall System Environment

Figure 1:
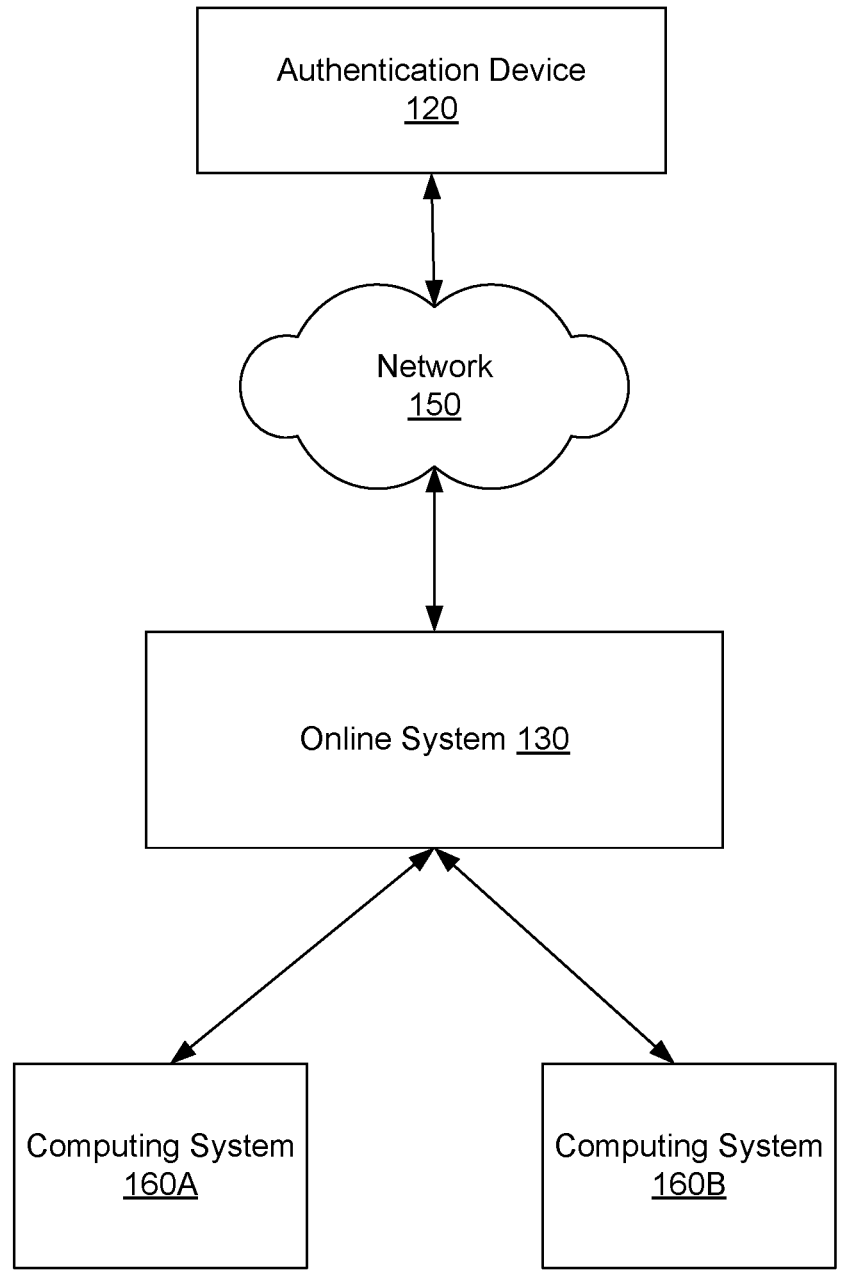
FIG. 1 is a block diagram of a system environment for performing authentication, in accordance with an embodiment.

FIG. 1 is a block diagram of a system environment for performing authentication, in accordance with an embodiment. The system environment 100 shown in FIG. 1 comprises an authentication device 120, an online system 130, and a network 150. In alternative configurations, different and/or additional components may be included in the system environment 100.

The authentication device 120 may include specialized hardware used for performing authentication. For example, the authentication device 120 may include hardware for scanning a smart card and generating an authentication token based on the smart card. The authentication device 120 may support other types of techniques for performing authentication for user, for example, multi-factor authentication, biometric base authentication such as authentication based on fingerprints or facial recognition.

In an embodiment, the authentication device creates a session with the user allowing the user to perform certain actions that provide the user with authentication. The session is closed after an authentication token is generated for the user. If the user needs authentication again, the authentication device generates a new session and requires the user to repeat the steps of the process used for authentication. For example, if the authentication device is smart card based, the authentication device requires the user to provide the user's smart card each time a new session is created, and user needs authentication.

The online system 130 includes various modules that implements the processes described herein that allow the user to access various computing resources within a secure perimeter. The online system has access to one or more computing systems 160A, 160B that providing computing resources to users, for example, web applications, servers (e.g., a cloud service hosts such as EC2 host), and so on. A computing system according to various embodiments includes a computing host, a data storage system, a network device, and others.

The online system receives an authentication token from the authentication device. For example, a primary authentication token may be issued via smart card authentication by the authentication device. The online system generates a short term authentication token that is securely provisioned. The user is allowed to access various computing systems and computing resources accessible by the online system during the time period that the short term authentication token is valid.

In an embodiment, the online system generates both (1) a SSH (secure shell) certificate and (2) a markup language token, for example, a SAML (Security Assertion Markup Language) token for enabling authentication to different types of resources. For example, the online system uses SSH certificate to provide access to various servers and uses SAML token to provide access to web applications. The online system provisions both of these credentials on a personalized session host assigned to the user, for example, a personalized virtual machine.

Although embodiments disclosed use SSH certificates, the techniques are applicable in other contexts using other types of certificates for accessing any type of computing resource. Similarly, embodiments disclosed use SAML token, the techniques are applicable in other contexts using other types of tokens for accessing other types of applications.

FIG. 1 shows a single instance of various components such as the authentication device 120, and computing resources 160. However, there may be multiple instances of each of these components. For example, there may be several authentication device 120 in communication with the online system 130. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral.

The network 150 provides a communication infrastructure between the authentication device 120 and the online system 130 as well as between the online system 130 and the computing systems 160. In some embodiments the various modules of the online system are distributed across different machines that interact with each other using the network 150. The network 150 is typically the Internet, but may be any network, including but not limited to a Local Area Network (LAN), a Metropolitan Area Network (MAN), a Wide Area Network (WAN), a mobile wired or wireless network, a private network, or a virtual private network. Portions of the network 150 may be provided by links using communications technologies including WiFi based on the IEEE 802.11 standard, the BLUETOOTH short range standard, and the Wireless Universal Serial Bus (USB) standard.

System Architecture

Figure 2:
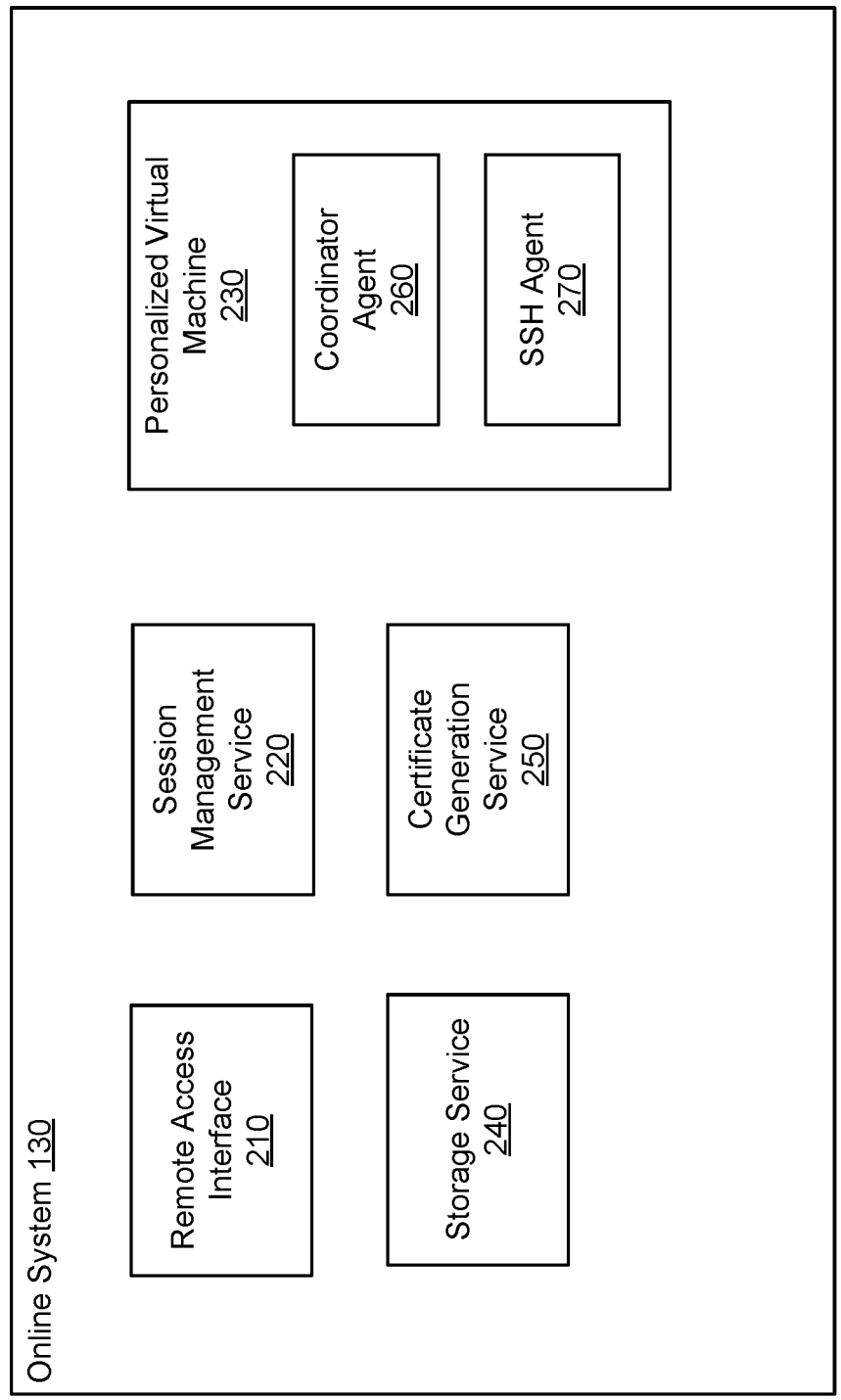
FIG. 2 illustrates the system architecture of an online system for performing authentication, in accordance with an embodiment.

FIG. 2 illustrates the system architecture of an online system for performing authentication, in accordance with an embodiment. The online system 130 comprises a remote access interface 210, a session management service 220, a personalized virtual machine 230, a storage service 240, and a certificate generation service 250. The various modules shown in FIG. 2 may execute on different computing systems. For example, the storage service 240 may sun on a separate server and is accessed by invoking remote APIs (application programming interfaces). Other embodiments of online systems 130 may include more or fewer modules than those indicated herein. There may be multiple instances of a module, for example, there may be multiple instances of personalized virtual machines 230, one instance assigned to each user. Conventional components such as network interfaces, security functions, load balancers, failover servers, management and network operation consoles, and the like are not shown so as to not obscure the details of the system architecture.

The remote access interface 210 acts as a portal for receiving authentication requests from users. A user authenticates using the authentication device 120 that executes an enhanced authentication procedure that is more secure than a typical authentication procedure, for example an authentication procedure that simply requires login and password. In an embodiment, the remote access interface 210 is a user interface.

The session management service 220 manages sessions for users. For example, the session management service 220 receives requests from the remote access interface 210 and may create a personalized virtual machine 230 for a user. In some embodiments, the session management service 220 provisions a pool of VMs and assigns them to users for a time interval. At the end of the time interval, the VM is unassigned. A VM that is unassigned to a user may be destroyed and a new VM is initialized with clean unassigned state for use again. The personalized virtual machine 230 is created for a user and allowed user to connect with the personalized virtual machine (VM) 230 for accessing various computing systems, for example, hosts or web applications. The personalized VM 230 runs a coordinator agent 260 that communicates with session management service 220. A coordinator agent may also be referred to herein as a session coordinator agent. In an embodiment, the coordinator agent 260 generates an asymmetric key pair (i.e., public-private key pair) and passes the public key back to the session management service 220.

The personalized VM 230 also runs a secure shell agent (SSH agent) 270 that allows the user to connect with various computing systems 160. The SSH agent 270 runs in the background and keeps the user's keys loaded into memory, so that the user does not have enter the passphrase every time the user needs to use the key.

The certificate generation service 250 creates signed certificates with predetermined expiry times and provides to a requestor, for example, the session management service 220. The certificate generation service is also referred to as an SSH CA Service. For example, the certificate generation service 250 may generate SSH certificates that allow the user to access hosts. The SSH certificate generation service is also responsible for distribution of trusted CA public keys and revoke lists to hosts in the environment.

SSH certificates are used for improving security. Some systems use SSH public key based authentication. An SSH public key is distributed openly, and anyone holding it can verify messages signed using its private key counterpart. While SSH Key-based authentication uses public key cryptography to operate, SSH Certificate-based authentication attaches a signed certificate to each key to verify their identities. SSH certificates may include user information such as username/host common name, validity timeframe, roles, permissions, etc., and a public key. This data is bound together with a digital signature from a trusted CA (certificate authority) using its own private key. The certificate is signed by a certificate authority (CA) that is a trusted party that holds its own public and private key pair. An SSH certificate includes fields signed by the certificate authority. Clients cannot modify these fields without breaking the signature. SSH certificate authentication extends public-key-based auth and uses the same protocol messages. In addition to verifying the public key signature, SSH certificate authentication comprises checking whether the certificate is signed by the trusted certificate authority.

To initiate a trusted connection, an entity A can provide its certificate and a digital signature using the private key corresponding to the public key contained in the certificate to another entity B. Entity B can validate the digital signature contained in a certificate against its own list of trusted CA public keys. If validation is successful, entity B can validate the digital signature generated directly by entity A, against the public key in the certificate. If validation is successful, Entity B can trust that entity A really is who they say they are in the passed certificate. For certificate based authentication to work, the public key of the trusted CA must be distributed to the relevant hosts so they can validate passed certificates. Additionally, once certificates are created, they are generally valid until they expire. To address the possibility of needing to prevent certificate based authentication before the expiry, a list of the revoked public keys associated to valid certificates is distributed.

The storage service 240 is used for storing the public key associated with a certificate. An example storage service 240 is an Apache Zookeeper™ service that maintains configuration information and provides distributed synchronization. However, the techniques disclosed are not limited to any particular storage service and any other storage system or service may be used instead. The public key of the certificate stored in the storage service 240 may be used for early revocation of access to the user if necessary, as described herein. The certificate generation service 250 is stateless and does not store information regarding the certificates created for various users. The storage service 240 allows the online system to maintain the state so that the certificates assigned to different users that are provided to personalized VMs for the users are tracked.

Authentication Process

Figure 3:
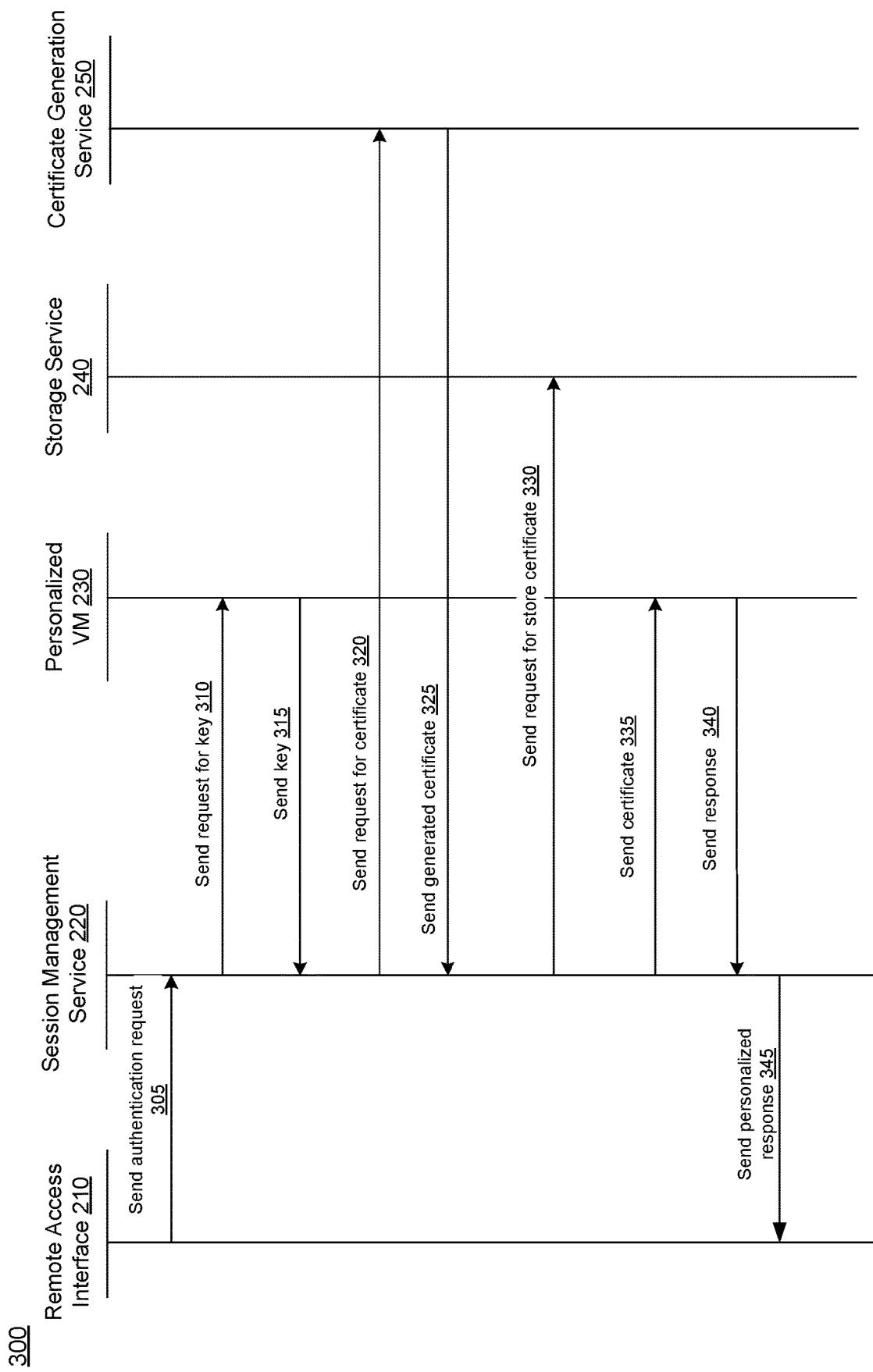
FIG. 3 is an interaction diagram showing the interactions between various modules for performing authentication according to an embodiment.

FIG. 3 is an interaction diagram showing the interactions 300 between various modules for performing authentication according to an embodiment.

The remote access interface 210 receives a request from the user to gain access to one or more computing systems 160. The request is sent by the user based on an authentication performed by the user via the authentication device 120. For example, the user may user a smart card on a workstation that acts as the authentication device 120. In an embodiment, the credentials received from the authentication device (e.g., the smart card based credentials) are provided by the remote access interface 210 to an authentication service (not shown in FIG. 3). The authentication service may be an OAuth service that performs account authorization and authentication and allows resource owners to authorize third-party access to their server resources without sharing their credentials. The remote access interface 210 receives an access token T1, for example, a SAML token generated by the authentication service. The access token T1 represents the user identity. The remote access interface 210 validates the access token T1 and allows the user to login to the remote access interface 210 responsive to successful validation of the token.

The remote access interface 210 acts as an entry point for the authentication process that allows the user to create a temporary session. The remote access interface 210 sends 305 an authentication request to the session management service 220.

The online system creates the personalized VM 230 for the user. The personalized VM 230 is within a security perimeter and acts as a gateway for the user to access other resources, such as computing systems 160A, 160B, etc. within the security perimeter. According to an embodiment, when the access token T1 corresponding to the user request is received by the remote access interface 210, the remote access interface 210 passes the access token T1 to the session management service 220. The session management service 220 either creates a new personalized VM or identifies an unassigned VM and assigns it to the user as the user's personalized VM. Once the personalized VM is assigned to the user, the online system performs the subsequent steps of the credential provisioning process. In an embodiment, the credential provisioning process provisions two credentials, (1) a SSH certificate that can be used for SSH access to other hosts and (2) a SAML token that is provisioned in the web browser cache of the personalized VM 230 to provide the user with access to web applications.

The session management service 220 sends 310 a request for a key to the personalized VM 230. The coordinator agent 260 on the personalized VM 230 generates an asymmetric (public-private) key pair and sends 315 the public key back to the session management service 220.

The session management service 220 establishes a trust relationship with the certificate generation service 250. In an embodiment, the session management service 220 sends 320 a request for certificate to the certificate generation service 250. The request sent 320 to the certificate generation service 250 includes the public key received from the personalized VM 230 and the access token T1 received by the remote access interface 210.

The certificate generation service 250 generates and sends 325 a signed certificate to the session management service 220. In an embodiment, the signed certificate contains signed public key, the user identity, and an expiry time stamp. The signed certificate may be based on a PGP (pretty good privacy) protocol. The signed certificate may be represented as a blob. The session management service 220 sends 330 the signed certificate to the storage service 240 for storing. The storage service 240 stores the signed certificate at least until the signed certificate expires.

The session management service 220 sends 335 the signed certificate to the coordinator agent 260 of the personalized VM 230. The coordinator agent 260 starts an SSH agent 270 on the personalized VM 230. The coordinator agent assigns the signed certificate to the SSH agent 270. The personalized VM 340 sends a response indicating the creation of the SSH agent 270 that can be used by the user. The session management service 220 sends 345 a personalized response to the remote access interface 310. The personalized response includes a link to the personalized VM 230 assigned to the user. The remote access interface 310 provides the personalized VM link to the user. The user can use the personalized VM 230 to interact with computing systems 160, for example, hosts and web applications.

The user can log in to the personalized VM 230 to interact with computing systems 160, for example, servers or web applications. Since the VM 230 is personalized for a specific user, only the assigned user can login to the personalized VM and access the computing system 160. Once the user logs into the personalized VM 230, the user can initiate an SSH session to other computing systems 160, for example, hosts within the secure perimeter using agent forwarding. The SSH agent 270 allows the user to connect with a computing system 160 without sending the user's private keys to the computing systems 160. The computing system 160 interacts with the SSH agent 270 on the personalized VM 230 to verify the identity of the user. Since SSH agent 270 already has a valid SSH certificate issued to the user and other computing systems 160 (i.e., hosts) have trusted signing key issued by the certificate generation service 250, the user is logged in as user's own identity. Accordingly, the user's identify is captured in all audit logs.

Once the certificate expiry time reaches, the certificate validity is expired and the certificate cannot be used for SSH authentication. As an optional feature, the online system may keep the certificate expiry time same as the personalized VM 230 expiry so that both expire at same time. The expiry time may be same or earlier than the VM 230 expiry.

In some embodiments, the online system performs SAML token provisioning to allow web authentication to the user. During session creation, the session management service 220 provides the access token T1 obtained by the remote access interface 210 to a single sign-on (SSO) service. The single sign-on service validates the received access token T1 and returns a SAML token T2 that can be used for web authentication. The session management service 220 sends the new SAML token T2 received from the single sign-on service to the session agent 270 of the personalized VM 230. The session agent 270 stores the SAML token T2 in the personalized VM's browser cache. When the user subsequently, logs in to personalized VM 230 and accesses the web application using the local browser of the personalized VM 230, the personalized VM 230 presents the pre-assigned token T2 to the application host as user identity. Accordingly, any web application that the user tries to access validates the user identity token T2 received from the single sign-on service and authenticates the user. Once the token T2 expires, the token T2 cannot be used to authenticate web applications.

Early Revocation of Access

In some embodiments, the user may terminate the personalized VM 230 early, i.e., before the predetermined expiry time. For example, the user may request the access for a period of time and determine that the access is not required for as long as previously requested and sends a request to terminate the access. The online system sends the personalized VM's corresponding public key to the certificate generation service 250 service to be revoked. In some embodiments, the revocation flow is triggered by an administrator in the event of a security incident.

Figure 4:
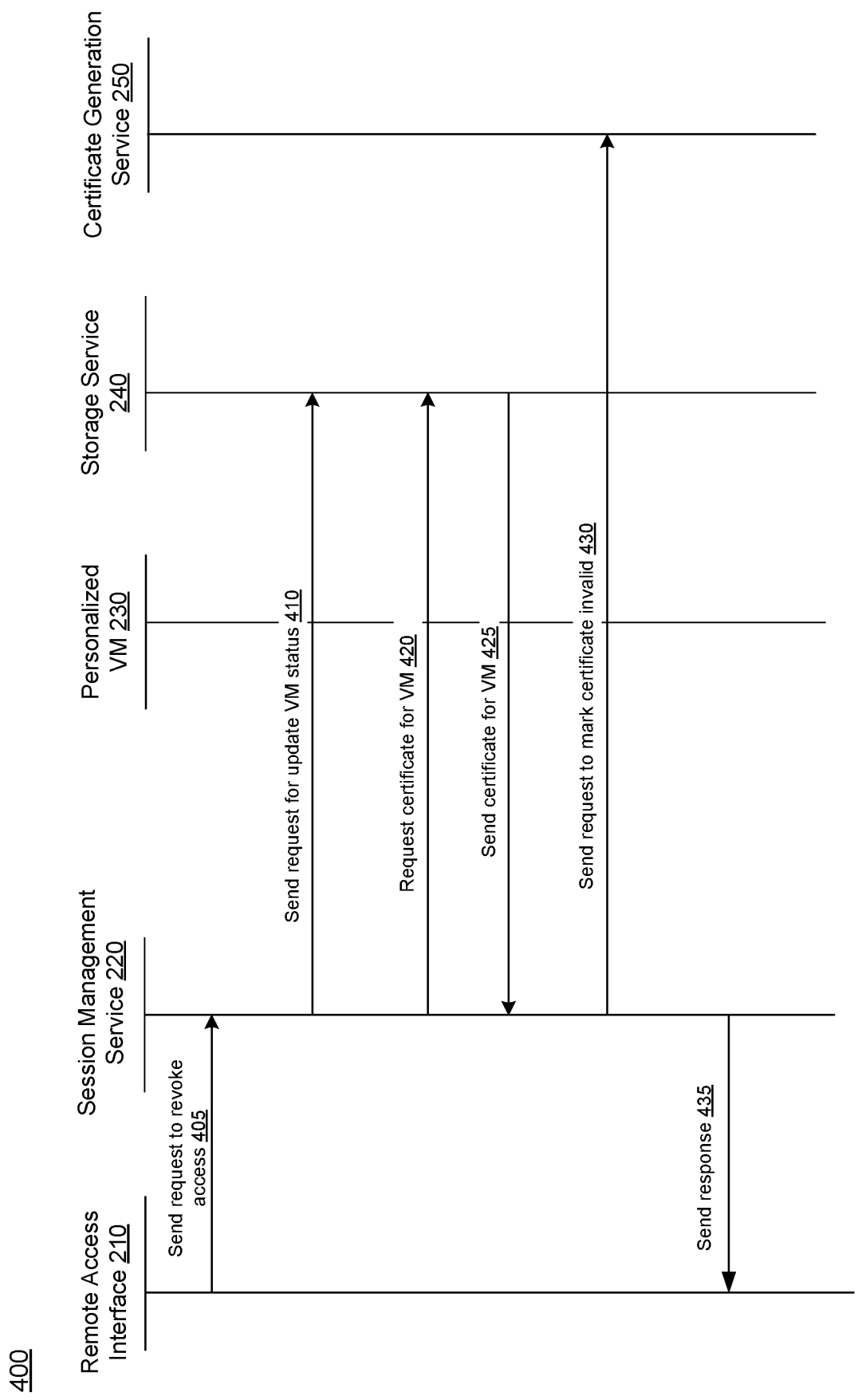
FIG. 4 is an interaction diagram showing the interactions between various modules for revoking access, according to an embodiment.
Figure 6:
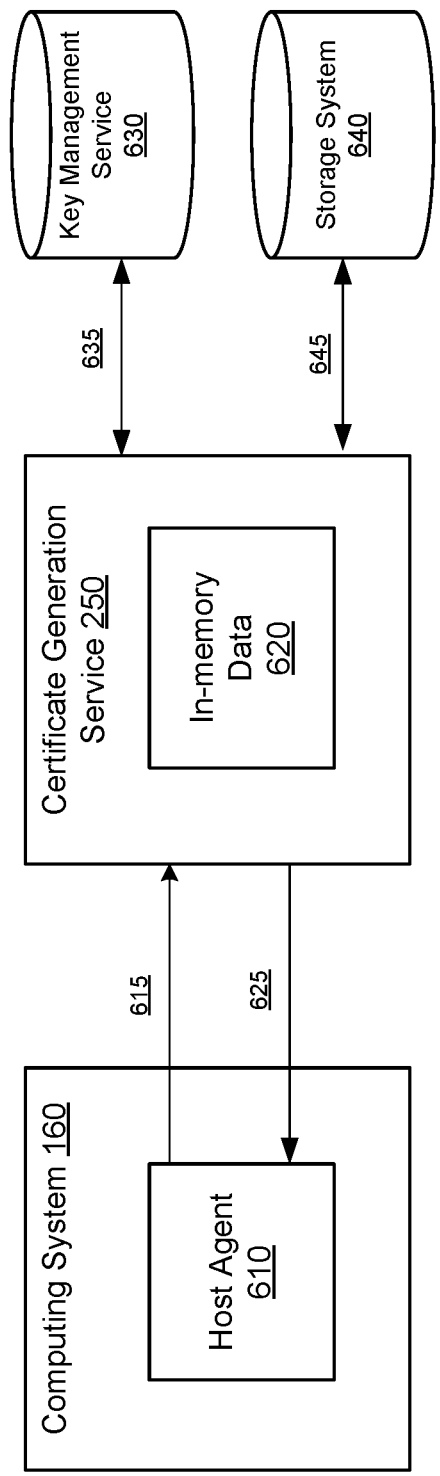
FIG. 6 shows a system environment illustrating how computing systems such as hosts maintain public keys and revoke lists, according to an embodiment.

FIG. 4 is an interaction diagram showing the interactions 400 between various modules for revoking access, according to an embodiment. Further details of revocation are illustrated in FIG. 6 and explained in connection with FIG. 6. The remote access interface 210 receives 405a a request from the user to revoke access. The session management service 220 sends 410 a request to the storage service 240 to update the status of the personalized VM 230. The storage service 240 marks that the personalized VM 230 is unassigned from the user. The session management service 220 requests 420 from the storage service 240, the public key associated with the certificate for the personalized VM 230 assigned to the user. The storage service 240 sends 425 the public key associated with the certificate for the personalized VM 230 assigned to the user to the session management service 220. The session management service 220 sends 430 a request to the certificate generation service 250 to mark the public key associated with the certificate received from the personalized VM 230 as invalid. The session management service 220 sends 435 to the user, a response to the request received 405 from the user. If the user does not perform early revocation of the access the access is available until the expiry of the certificate.

Overall Process

Figure 5:
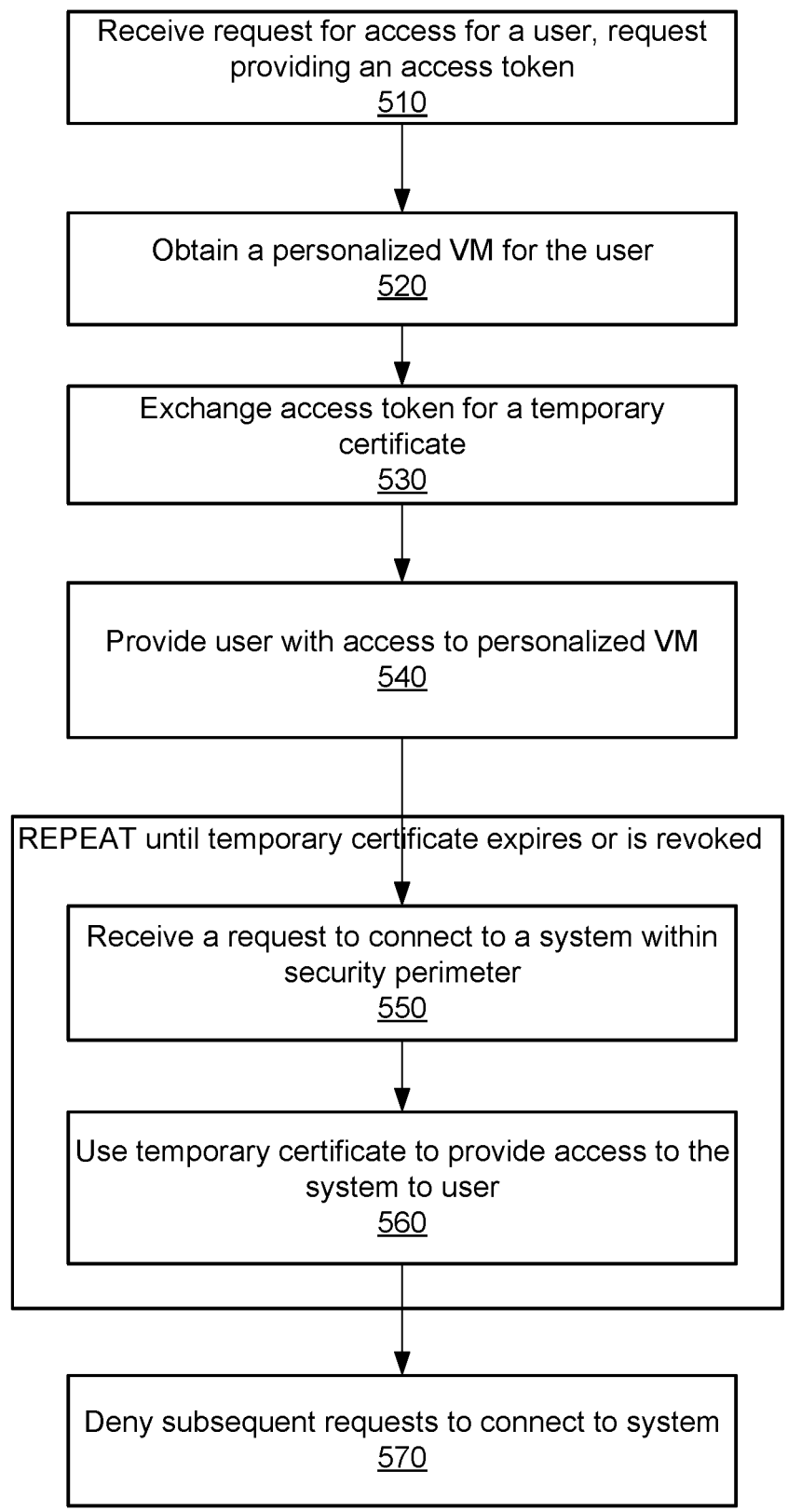
FIG. 5 shows a flowchart illustrating the process of anomaly detection, according to an embodiment.

FIG. 5 shows a flowchart illustrating the process of anomaly detection, according to an embodiment. The steps described herein may be performed in an order different from that indicated herein. Furthermore, each step may be performed by a module different from that indicated herein.

The online system 130 receives 510 a request for access to one or more systems from a user. The request is received responsive to the user performing authentication using an authentication device, for example, a workstation that provides smart card based authentication. The request for access provides an access token, for example, an SAML token. The online system may receive credentials from the authentication device and provide the credentials to an authentication service to obtain the access token.

The online system obtains 520 a personalized virtual machine for the user. The online system exchanges 530 the access token for a temporary certificate having an expiry time. For example, the online system may provide the access token to a credential generation service and obtain the temporary certificate having an expiry time from the credential generation service. The online system provides 540 the temporary certificate to a personalized virtual machine. The online system provides the user with access to the personalized virtual machine.

The online system allows the user to connect to any of a plurality of systems via the personalized virtual machine without requiring the user to authenticate again using the authentication device. The systems may be servers or web applications. The online system allows the users to repeatedly perform the steps 550 and 560 until the temporary certificate either expires or is revoked. The personalized virtual machine receives 550 a request to connect to a system selected from the plurality of systems. If the temporary certificate is not expired, the personalized virtual machine provides 560 the user with access the selected system.

Once the expiry time of the temporary certificate expires, the online system denies 570 any subsequent requests from the user to connect to any of the plurality of systems until the user repeats the above process.

For certificate based authentication to work, the public key of the trusted CA is distributed to the relevant hosts so they can validate passed certificates. Once certificates are created, they are valid until they expire. To address the possibility of having to prevent certificate based authentication before the expiry, a list of the revoked public keys associated to valid certificates must also be distributed.

FIG. 6 shows a system environment illustrating how computing systems such as hosts maintain public keys and revoke lists, according to an embodiment. As shown in FIG. 6, a computing system 160 (e.g., a host running on a cloud platform) executes an agent referred to as a host agent 610. A host agent is also referred to as an SSH trust provider agent. The host agent 610 maintains a host trusted public keys, revoke list, and host certificates. The host agent periodically communicates 615 with the certificate generation service 250 to refresh 625 the host trusted public keys and revoke list. The revoke list stores the list of certificates that have been explicitly revoked by the users. The certificate generation service 250 periodically interacts 635, 645 with a key management service 630 and a storage system 640 (e.g., a S3 bucket of a cloud platform) to periodically refresh the public keys of the signing certificate authority (CA) and revoke lists. The SSH certificate that is signed by a trusted CA is trusted by the host. A list of trusted user keys is not required at the host level. Accordingly, if any of the public keys are expired or revoked, the certificate generation service 250 obtains the information and stores the information as in-memory data 620. Each host agent 610 running on a computing system 160 periodically obtains the information from the in-memory data 620 of the certificate generation service 250. Accordingly, if any public keys are invalidated or revoked, the information is propagated to all the host agents within a time interval determined by the periodicity with which the host agents update their information.

Alternatively, the certificate generation service 250 maintains a list of all the host agents 610 that have obtained the public keys and revoke lists from the certificate generation service 250 and pushes out the information to the host agents whenever there is a change in the information. This embodiment provides the updated information to the host agents as soon as possible. However, this embodiment is inefficient if the number of hosts is very large since the certificate generation service 250 may push information to a large number of host agents even if they do not need the updated information.

When a user's personalized virtual machine is terminated, for example, terminated by the user or an administrator in the event of a security incident, the session management service uses previously provisioned service PKI (public key infrastructure) credentials to send a revocation request to the certificate generation service, passing the public key associated with the CA signed certificate that was provisioned to the users personalized virtual machine at startup.

The certificate generation service validates the caller's PKI credentials, ensuring the request came from the session management service, and then stores the public key as an independent object in a storage service, for example, in an AWS S3 bucket for durable storage. According to an embodiment, the storage service storing the revoke list uses an object lifecycle policy of a time interval of a predetermined length, for example, 8 days, matching the validity lifespan of a CA signed certificate. After the time interval, the corresponding objects are automatically removed. This ensures the revoke list does not continue growing indefinitely while making sure a certificate remains on the revoke list for the entirety of its lifespan. All certificate generation service instances (or replicas) periodically poll the storage service to keep an up to date revoke list, and CA public key list respectively.

In some embodiments, the host agent is distributed to all hosts in the environment through a base host image. The host agent runs as a background service, e.g., as a system service.

On host startup, the host agent utilizes previously provisioned service PKI credentials to apply for a long lived host SSH certificate from the certificate generation service. On receiving the request for a host certificate, the certificate generation service validates the passed PKI credentials, and pulls relevant data from the same credentials (IP, subject common name) to be placed as principles in a new SSH host certificate. This certificate is then signed using the current in-memory CA signing keys and returned to the host agent.

This host certificate is refreshed by the agent as needed shortly before its expiration. The host certificate is used to provide mutual trust with connecting SSH Clients. Both the host and client are configured to trust the SSH CA signing keys. When a client attempts an SSH connection to a host, the certificates are exchanged and verified by both parties against their own list of trusted CA public keys.

On startup and then at a set frequency, the host agent running on every host activates (i.e., wakes up) to make a request to the certificate generation service to refresh the hosts trusted CA public keys list and revoked keys list. The frequency at which the host agent activates may be configurable, for example, once per hour.

On receiving the request, the certificate generation service pulls an in-memory CA public key list and revoke list and returns them to the host agent. If the request fails, the host agent continues retrying a configurable number of times (for example, up to 5 times). The retrying may be performed with exponential backoff.

If all requests still fail, the previously written trusted CA public keys list and revoke list is not updated. This adds robustness in the event of an upstream outage so that certificate based authorization is still available. At every activation (i.e., wake up), the host agent publishes detailed success/error metrics to a centralized metric collections service to facilitate troubleshooting/monitoring across the environment.

Once the revoke list is picked up by the hot agent on a particular host, additional authorization attempts using a certificate associated with a revoked public key fail.

Computer Architecture

Figure 7:
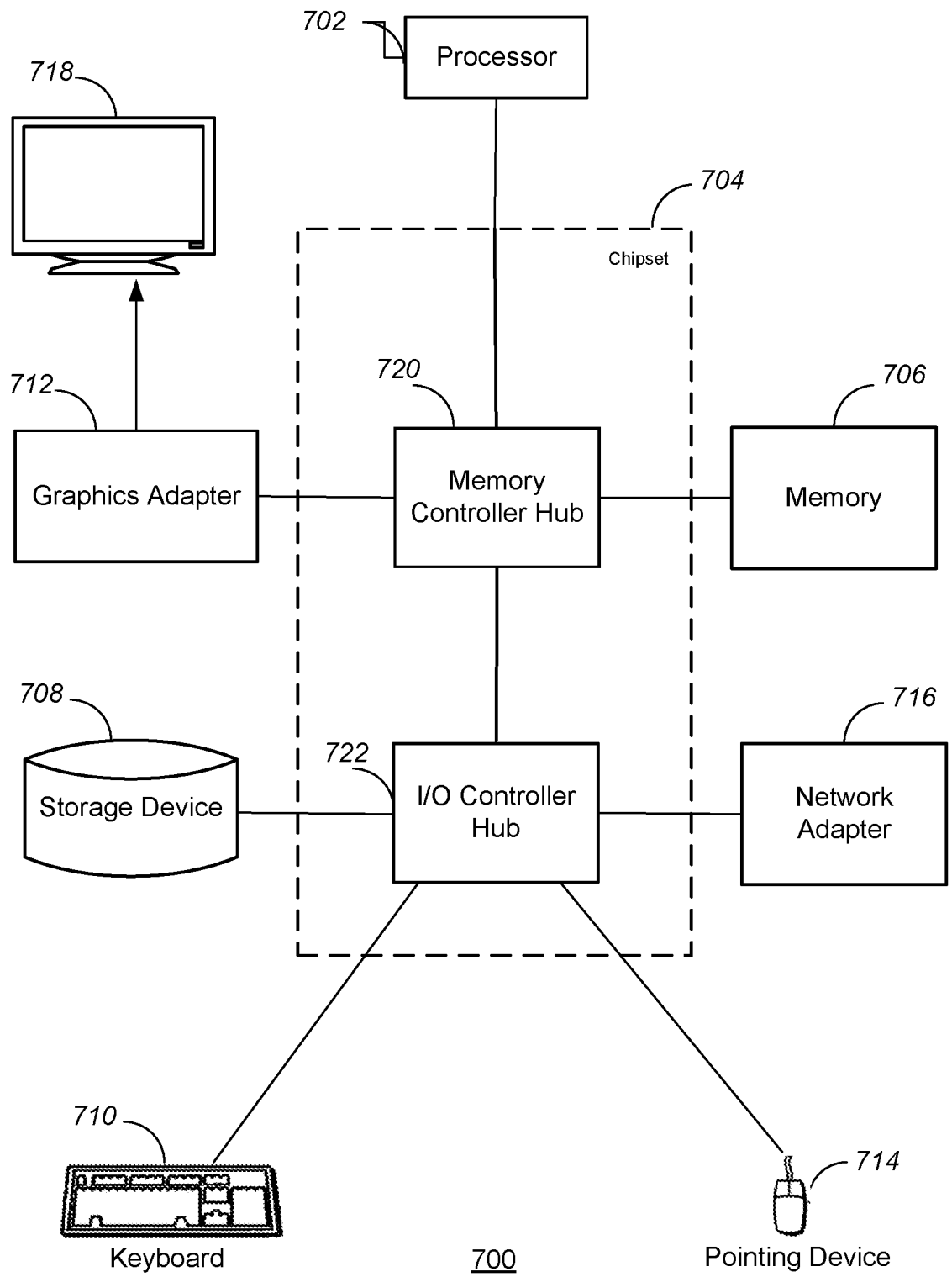
FIG. 7 is a high-level block diagram illustrating an example computer for implementing the client device and/or the computing system of FIG. 1.

FIG. 7 is a high-level block diagram illustrating an example computer for implementing the client device and/or the computing system of FIG. 1. The computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, an input device 714, and network adapter 716 are coupled to the I/O controller hub 722. Other embodiments of the computer 700 have different architectures.

The storage device 708 is a non-transitory computer-readable storage medium such as a hard drive, compact disk read-only memory (CD-ROM), DVD, or a solid-state memory device. The memory 706 holds instructions and data used by the processor 702. The input interface 714 is a touch-screen interface, a mouse, track ball, or other type of pointing device, a keyboard 710, or some combination thereof, and is used to input data into the computer 700. In some embodiments, the computer 700 may be configured to receive input (e.g., commands) from the input interface 714 via gestures from the user. The graphics adapter 712 displays images and other information on the display 718. The network adapter 716 couples the computer 700 to one or more computer networks.

The computer 700 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 708, loaded into the memory 706, and executed by the processor 702.

The types of computers 700 used by the entities of FIG. 1 can vary depending upon the embodiment and the processing power required by the entity. The computers 700 can lack some of the components described above, such as graphics adapters 712, and displays 718. For example, the computing system 130 can be formed of multiple blade servers communicating through a network such as in a server farm.

Alternative Embodiments

It is to be understood that the Figures and descriptions of the disclosed invention have been simplified to illustrate elements that are relevant for a clear understanding of the present invention, while eliminating, for the purpose of clarity, many other elements found in a typical distributed system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for authenticating users, the computer implemented method comprising:
    receiving from a user, a request for access to one or more systems of a plurality of systems, the request comprising an access token generated responsive to performing authentication via an authentication device;
    obtaining a personalized virtual machine assigned to the user;
    exchanging, using a certificate generation service, the access token for a temporary certificate having an expiry time;
    providing the temporary certificate to the personalized virtual machine;
    providing the user with access to the personalized virtual machine;
    allowing the user to connect to any of the plurality of systems without requiring the user to authenticate again using the authentication device, comprising, repeating a plurality of times before the temporary certificate is expired:
        receiving, by the personalized virtual machine, a request to connect to a system selected from the plurality of systems, and providing, by the personalized virtual machine, the user with access to the selected system; and
    responsive to exceeding the expiry time of the temporary certificate, denying, by the personalized virtual machine, subsequent requests from the user to connect to any of the plurality of systems.

2. The computer implemented method of claim 1, wherein exchanging the access token for the temporary certificate comprises:
    receiving a public key from the personalized virtual machine;
    sending the public key received from the personalized virtual machine to the certificate generation service;
    receiving a signed certificate form the certificate generation service; and
    providing the signed certificate to the personalized virtual machine, wherein the signed certificate is used by the personalized virtual machine for allowing the user to access the selected system.

3. The computer implemented method of claim 1, further comprising:
    obtaining a markup language token for the user;
    storing the markup language token in a browser cache of the personalized virtual machine; and
    using the markup language token to allow the user to access a plurality of web applications.

4. The computer implemented method of claim 1, further comprising:
    receiving a request to revoke access granted to the user; and
    unassigning the personalized virtual machine from the user.

5. The computer implemented method of claim 4, further comprising:
    sending a request to the certificate generation service to invalidate the temporary certificate.

6. The computer implemented method of claim 1, wherein each of the plurality of systems interacts with the certificate generation service to determine whether the temporary certificate is valid.

7. The computer implemented method of claim 1, wherein the authentication device grants access to the user based on multi-factor authentication.

8. The computer implemented method of claim 1, wherein the authentication device grants access to the user based on a smart card.

9. A non-transitory computer readable storage medium storing instructions that when executed by one or more computer processors cause the one or more computer processors to perform steps comprising:
  receiving from a user, a request for access to one or more systems of a plurality of systems, the request comprising an access token generated responsive to performing authentication via an authentication device;
  obtaining a personalized virtual machine assigned to the user;
  exchanging, using a certificate generation service, the access token for a temporary certificate having an expiry time;
  providing the temporary certificate to the personalized virtual machine;
  providing the user with access to the personalized virtual machine;
  allowing the user to connect to any of the plurality of systems without requiring the user to authenticate again using the authentication device, comprising, repeating a plurality of times before the temporary certificate is expired:
  receiving, by the personalized virtual machine, a request to connect to a system selected from the plurality of systems, and providing, by the personalized virtual machine, the user with access to the selected system; and
  responsive to exceeding the expiry time of the temporary certificate, denying, by the personalized virtual machine, subsequent requests from the user to connect to any of the plurality of systems.

10. The non-transitory computer readable storage medium of claim 9, wherein the instructions for exchanging the access token for the temporary certificate further cause the one or more computer processors to perform steps comprising:
  receiving a public key from the personalized virtual machine;
  sending the public key received from the personalized virtual machine to the certificate generation service;
  receiving a signed certificate form the certificate generation service; and
  providing the signed certificate to the personalized virtual machine, wherein the signed certificate is used by the personalized virtual machine for allowing the user to access the selected system.

11. The non-transitory computer readable storage medium of claim 9, wherein the instructions further cause the one or more computer processors to:
  obtaining a markup language token for the user;
  storing the markup language token in a browser cache of the personalized virtual machine; and
  using the markup language token to allow the user to access a plurality of web applications.

12. The non-transitory computer readable storage medium of claim 9, wherein the instructions further cause the one or more computer processors to:
  receiving a request to revoke access granted to the user; and
  unassigning the personalized virtual machine from the user.

13. The non-transitory computer readable storage medium of claim 12, wherein the instructions further cause the one or more computer processors to:
  sending a request to the certificate generation service to invalidate the temporary certificate.

14. The non-transitory computer readable storage medium of claim 9, wherein each of the plurality of systems interacts with the certificate generation service to determine whether the temporary certificate is valid.

15. A computer system comprising: one or more computer processors; and non-transitory computer readable storage medium storing instructions that when executed by the one or more computer processors causes the one or more computer processors to perform steps comprising:
  receiving from a user, a request for access to one or more systems of a plurality of systems, the request comprising an access token generated responsive to performing authentication via an authentication device;
  obtaining a personalized virtual machine assigned to the user;
  exchanging, using a certificate generation service, the access token for a temporary certificate having an expiry time;
  providing the temporary certificate to the personalized virtual machine;
  providing the user with access to the personalized virtual machine;
  allowing the user to connect to any of the plurality of systems without requiring the user to authenticate again using the authentication device, comprising, repeating a plurality of times before the temporary certificate is expired:
  receiving, by the personalized virtual machine, a request to connect to a system selected from the plurality of systems, and providing, by the personalized virtual machine, the user with access to the selected system; and
  responsive to exceeding the expiry time of the temporary certificate, denying, by the personalized virtual machine, subsequent requests from the user to connect to any of the plurality of systems.

16. The computer system of claim 15, wherein the instructions for exchanging the access token for the temporary certificate further cause the one or more computer processors to perform steps comprising:
  receiving a public key from the personalized virtual machine;
  sending the public key received from the personalized virtual machine to the certificate generation service;
  receiving a signed certificate form the certificate generation service; and
  providing the signed certificate to the personalized virtual machine, wherein the signed certificate is used by the personalized virtual machine for allowing the user to access the selected system.

17. The computer system of claim 15, wherein the instructions further cause the one or more computer processors to:
  obtaining a markup language token for the user;
  storing the markup language token in a browser cache of the personalized virtual machine; and
  using the markup language token to allow the user to access a plurality of web applications.

18. The computer system of claim 15, wherein the instructions further cause the one or more computer processors to:
  receiving a request to revoke access granted to the user; and
  unassigning the personalized virtual machine from the user.

19. The computer system of claim 18, wherein the instructions further cause the one or more computer processors to:
  sending a request to the certificate generation service to invalidate the temporary certificate.

20. The computer system of claim 15, wherein each of the plurality of systems interacts with the certificate generation service to determine whether the temporary certificate is valid.

\* \* \* \* \*